(12) United States Patent
Scenna et al.

(10) Patent No.: US 12,387,278 B2
(45) Date of Patent: Aug. 12, 2025

(54) ARTIFICIAL INTELLIGENCE BASED APPROACH FOR SUPPLEMENTING AN EXPLANATION OF A RESULT DETERMINED BY A SOFTWARE APPLICATION

(71) Applicant: INTUIT INC., Mountain View, CA (US)

(72) Inventors: Kyle Bruno Scenna, Ontario (CA); Vinoth Jeba Kumar Radha Krishnan, Ontario (CA); David Cameron Thompson, Toronto (CA)

(73) Assignee: Intuit Inc., Mountain View, CA (US)

( * ) Notice: Subject to any disclaimer, the term of this patent is extended or adjusted under 35 U.S.C. 154(b) by 34 days.

(21) Appl. No.: 18/240,828

(22) Filed: Aug. 31, 2023

(65) Prior Publication Data
US 2025/0078171 A1   Mar. 6, 2025

(51) Int. Cl.
*G06Q 30/00* (2023.01)
*G06Q 40/12* (2023.01)

(52) U.S. Cl.
CPC ................ *G06Q 40/123* (2013.12)

(58) Field of Classification Search
CPC .................................................... G06Q 40/123
USPC .................. 705/31, 1.1, 41, 14.54, 42, 7.28; 715/256, 760, 773; 709/203, 219
See application file for complete search history.

(56) References Cited

U.S. PATENT DOCUMENTS

| | | | |
|---|---|---|---|
| 2021/0076106 A1* | 3/2021 | Marten | H04N 21/44008 |
| 2024/0330605 A1* | 10/2024 | Hunn | H04L 9/3247 |

OTHER PUBLICATIONS

ProQuestDialog NPL Search History.*

* cited by examiner

*Primary Examiner* — John H. Holly
(74) *Attorney, Agent, or Firm* — Patterson + Sheridan, LLP (57) ABSTRACT

A method for generating supplemental content for an explanation for a particular result determined by a software application includes receiving data indicative of a user selecting a first modality of a plurality of different modalities for supplementing the explanation. In response to receiving the data, the method includes providing inputs to a generative artificial intelligence model. The inputs include data indicative of the explanation and data indicative of a first natural language prompt associated with the first modality. The method includes receiving an output from the generative artificial intelligence model. The output includes supplemental content for the explanation. The method includes displaying the supplemental content for viewing via a user interface.

14 Claims, 6 Drawing Sheets

ARTIFICIAL INTELLIGENCE BASED APPROACH FOR SUPPLEMENTING AN EXPLANATION OF A RESULT DETERMINED BY A SOFTWARE APPLICATION

INTRODUCTION

Aspects of the present disclosure are directed to techniques for supplementing an explanation of a particular result determined by a software application. More particularly, the present disclosure is directed to techniques for using artificial intelligence to supplement the explanation in one or more ways.

BACKGROUND

Every year millions of people, businesses, and organizations around the world utilize software applications to assist with countless aspects of life. For example, a person may utilize a software application to prepare a tax return. The software application may generate an explanation for a particular result (e.g., tax credit) determined by the software application for the given tax return. However, the explanation may include the same level of detail regardless of whether the person is an experienced user (e.g., someone who has previously used the software application) or a novice user (e.g., someone who not previously used the software application). Therefore, the explanation of the particular result may not include enough detail for the novice user to find the explanation helpful.

Accordingly, there is a need for techniques for improving such explanations to make them more helpful to less-experienced users.

BRIEF SUMMARY

In one aspect, a method is provided. The method includes receiving data indicative of a user selecting a first modality of a plurality of different modalities for supplementing an explanation generated by a software application to explain a particular result determined by the software application in preparing a document for the user. Furthermore, in response to receiving the data, the method includes providing inputs to a generative artificial intelligence model. The inputs include data indicative of the explanation and data indicative of a first natural language prompt associated with the first modality. The method further includes receiving an output from the generative artificial intelligence model. The output is based, at least in part, on the inputs provided to the generative artificial intelligence model and includes supplemental content for the explanation according to the first modality. The method includes displaying the supplemental content for viewing via a user interface.

In another aspect, a non-transitory computer-readable storage medium is provided that stores instructions that, when executed by a computer system, cause the computer system to perform the method set forth above. In yet another aspect, a system is provided that includes at least one memory and at least one processor configured to perform the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, computing systems, and computer readable medium for supplementing an explanation of a particular result determined by a software application.

Example aspects of the present disclosure are directed to software applications that are utilized to prepare documents. For example, such software applications may include tax preparation software for preparing tax returns. The tax preparation software may generate and display (e.g., via a user interface) an explanation (e.g., a question and answer) for a particular result (e.g., tax credit) determined by the tax preparation software for a given tax return. The explanation may include the same level of detail regardless of whether the user (e.g., tax filer) of the tax preparation software is an experienced user (e.g., a person who has previously used the tax preparation software) or a novice user (e.g., a person who has not previously used the tax preparation software). More specifically, the level of detail included in the explanation may be insufficient (e.g., lacking enough detail) for a novice user and, as a result, may not be helpful in explaining the particular result to the novice user.

Example aspects of the present disclosure are directed to artificial intelligence based approaches for supplementing the explanation of the particular result determined by the software application. For instance, in some embodiments, the user interface displaying the explanation of the particular result may additionally display a user interface tool. As will now be discussed, a user (e.g., a novice user) of the software application may interact with the user interface tool to request the explanation be supplemented in a plurality of different ways.

In some embodiments, the user interface tool may include a first user interface element that, when selected by the user, activates a first modality in which a more detailed explanation of the particular result is generated using a generative artificial intelligence model. For instance, in some embodiments, selection of the first user interface element by the user may cause the explanation (e.g., question and answer) generated by the software application to be provided as an input to the generative artificial intelligence model. Selection of the first user interface element by the user may also cause a natural language prompt associated with the first modality to be provided as an input to the generative artificial intelligence model. As an example, the natural language prompt associated with the first modality may read, "Based on the provided question and answer, please reformulate the answer in a way that is easy to understand for novice users. Provide more context and explain in depth." The generative artificial intelligence model may output a more detailed explanation of the particular result determined by the software application based, at least in part, on the inputs (that is, the natural language prompt associated with the first modality and the explanation generated by the software application).

In some embodiments, the user interface tool may include a second user interface element that, when selected by the user, activates a second modality in which one or more follow-up questions and corresponding answers are generated for the explanation using the generative artificial intelligence model. For instance, in some embodiments, selection of the second user interface element by the user may cause the explanation (e.g., question and answer) generated by the software application to be provided as an input to the generative artificial intelligence model. Selection of the second user interface element by the user may also cause a natural language prompt associated with the second modality to be provided as an input to the generative artificial intelligence model. As an example, the natural language prompt associated with the second modality may read, "Based on the provided question and answer, generate follow up questions a novice user may have along with answers for each of the follow-up questions. Make sure that the follow-ups and answers are closely related to the provided question and answer." Furthermore, in some embodiments, the natural language prompt may include one or more examples of follow-up questions and answers. The generative artificial intelligence model may output one or more follow-up questions and corresponding answers based, at least in part, on the inputs (that is, the natural language prompt associated with the second modality and the explanation generated by the software application).

In some embodiments, the user interface tool may include a third user interface element that, when selected by the user, activates a third modality in which definitions for one or more key terms included in the explanation generated by the software application are generated using the generative artificial intelligence model. For instance, in some embodiments, selection of the third user interface element by the user may cause the explanation (e.g., question and answer) generated by the software application to be provided as an input to the generative artificial intelligence model. Selection of the third user interface element by the user may also cause a natural language prompt associated with the third modality to be provided as an input to the generative artificial intelligence model. As an example, the natural language prompt associated with the third modality may read, "Based on the provided question and answer, define terms that may be unfamiliar to novice users. Provide more context and explain in depth." The generative artificial intelligence model may output definitions for one or more key terms included in the explanation based, at least in part, on the inputs (that is, the natural language prompt associated with the third modality and the explanation generated by the software application).

In some embodiments, the user interface tool may include a fourth user interface element that, when selected by the user, activates a fourth modality in which one or more example scenarios of when the particular result is applicable and/or one or more example scenarios of when the particular result is not applicable may be generated using the generative artificial intelligence model. For instance, in some embodiments, selection of the fourth user interface element by the user may cause the explanation (e.g., question and answer) generated by the software application to be provided as an input to the generative artificial intelligence model. Selection of the fourth user interface element by the user may also cause a natural language prompt associated with the fourth modality to be provided as an input to the generative artificial intelligence model. As an example, the natural language prompt associated with the fourth modality may read, "Based on the provided question and answer, provide example scenarios when this would and would not apply." The generative artificial intelligence model may output one or more example scenarios of when the particular result is applicable and/or one or more example scenarios of when the particular result is not applicable based, at least in part, on the inputs (that is, the natural language prompt associated with the fourth modality and the explanation generated by the software application).

It should be appreciated that additional inputs may be provided to the generative artificial intelligence model to provide additional context about the user requesting the explanation generated by the software application be supplemented in one of the different ways discussed above. For instance, in some embodiments, attributes about the user that may be provided as an input to the generative artificial intelligence model may include, without limitation, age of the user, education of the user, and/or whether the user has used the software application before.

In some embodiments, the explanation generated by the software application for a particular result determined by the software application may not need to be supplemented in each of the different ways discussed above. In such embodiments, the user interface tool displayed by the user interface may include less than the total number of user interface elements (e.g., 4 user interface elements).

In some embodiments, the software application may be configured to rank the output (e.g., supplemental content) generated by the generative artificial intelligence model for each of the different modalities. For example, the software application may be configured to rank the different modalities for supplementing the explanation from most helpful to least helpful. Furthermore, in some embodiments, the software application may select the top two most helpful modalities in the rankings and the user interface tool may display the user interface elements associated with the top two most helpful modalities.

Figure 1:
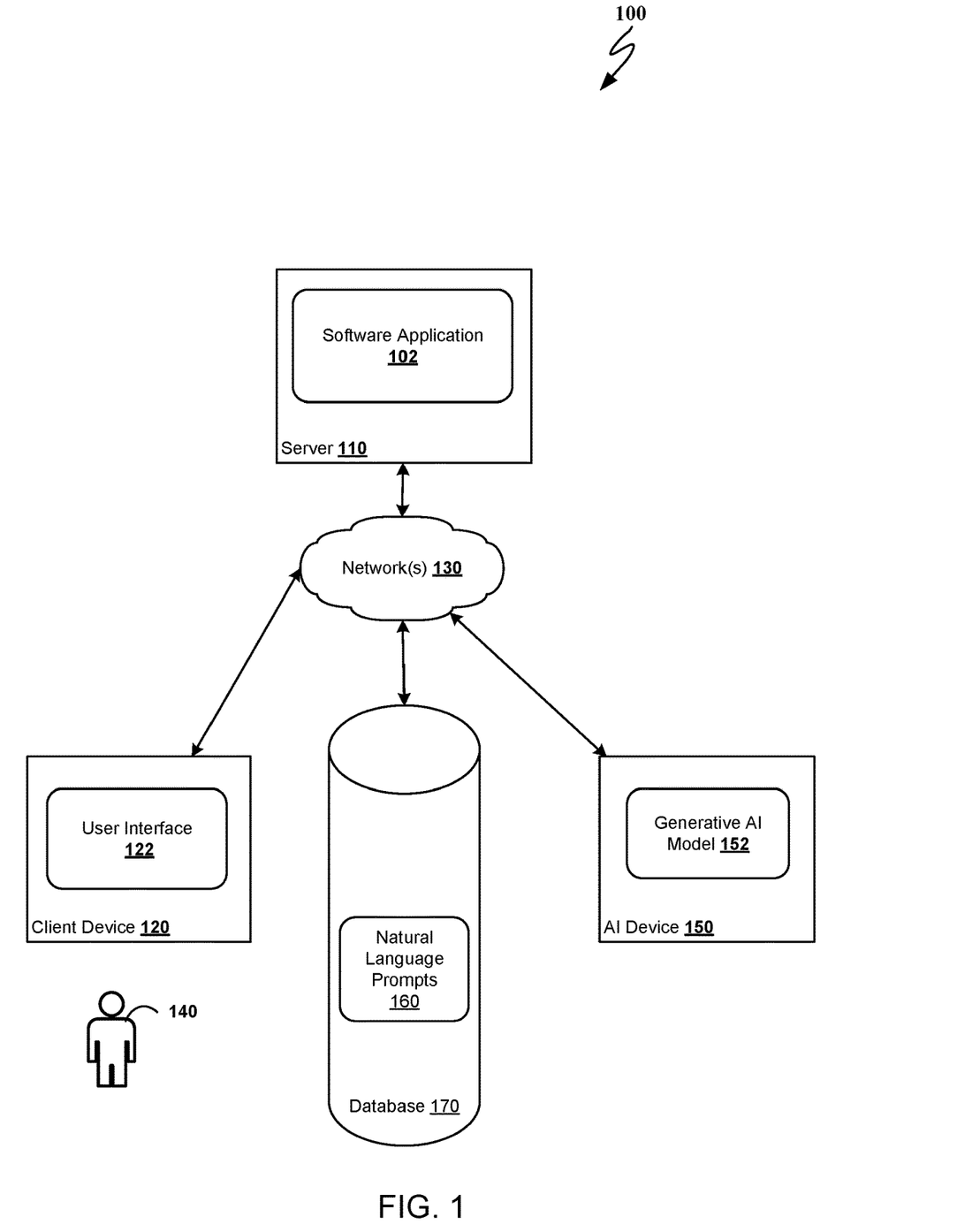
FIG. 1 depicts a computing environment for generating supplemental content for an explanation of a particular result determined by a software application according to some embodiments of the present disclosure.

Example aspects of the present disclosure provide numerous technical effects. For instance, supplementing an explanation generated by a software application to explain a particular result determined by the software application may improve novice users understanding of how the particular result was determined by the software application. In this manner, the user experience of novice users of the software application may be improved. Furthermore, the different modalities for supplementing the explanation allows the explanation to be supplemented in more than one way thereby increasing the likelihood of novice users understanding of the explanation and, as a result, having an improved experience using the software application. Still further Example Computing Environment for Generating Supplemental Content for an Explanation of a Particular Result Determined by a Software Application FIG. 1 illustrates a computing environment 100 for generating supplemental content for an explanation generated by a software application 102 used to assist with preparation of a document according to some embodiments of the present disclosure. In some embodiments, the document may be a financial document, such as a tax return. In such implementations, the software application 102 may be tax preparation software. It should be appreciated, however, that the scope of the present disclosure is intended to be limited to tax preparation software assisting with preparation of a tax return.

The computing environment 100 may include a server 110 and a client device 120 (e.g., mobile phone, tablet, laptop, etc.) communicatively coupled to the server 110 via one or more networks 130. Examples of the network(s) 130 may include, without limitation, a wide area network (WAN), a local area network (LAN), and/or a cellular network.

As shown, the software application 102 is stored in memory (not shown) of the server 110 and is executed by one or more processors of the server 110. In alternative embodiments, the software application 102 may be stored in memory of the client device 120 and executed by one or more processors of the client device 120. In this manner, the software application 102 may be executed locally on the client device 120. In still other embodiments, functionality of the software application 102 may be distributed amongst the server 110 and the client device 120. For instance, in such embodiments, one or more functions associated with the software application 102 may be executed on the server 110 and one or more functions associated with the software application 102 may be executed on the client device 120.

The client device 120 may include a user interface 122 that allows a user 140 to interact with the software application 102. For instance, the user 140 may input information via the user interface 122. Examples of such information may include login credentials (e.g., username and password) for the software application 102. The user 140 may also interact with the user interface 122 to upload one or more forms (e.g., W-2, 1099, etc.) that are specific to the user 140 and may be processed by the software application 102 to prepare a document (e.g., tax return) for the user 140.

Based on the information (e.g., forms) provided by the user 140, the software application 102 may be configured to determine a particular result (e.g., tax credit) associated with the document (e.g., tax return) being prepared for the user 140. The software application 102 may be further configured to generate an explanation for the particular result determined by the software application 102. In some implementations, the explanation may be displayed on the user interface 122 in a question and answer format. For example, if the particular result determined by the software application 102 is a tax credit, the question portion of the explanation may read "How did you calculate my tax credit?" and the answer portion of the explanation may include one or more sentences explaining how the tax credit was determined given the specific tax situation of the user 140.

In some embodiments, the user 140 may be a first-time user of the software application 102 and may not be well-versed in the subject matter (e.g., taxes) of the document (e.g., tax return) being prepared by the software application 102. For example, the user 140 may be an individual that is under the age of 25 and preparing the document (e.g., tax return) for the first-time. In such embodiments, the user 140 may wish to supplement the explanation generated by the software application 102 in one or more ways to better understand how the particular result (e.g., tax credit) was determined by the software application 102.

In some embodiments, the user interface 122 may include a user interface tool (discussed in more detail in FIG. 2) that the user 140 may interact with to supplement the explanation generated by the software application 102 in one or more ways. For instance, in some implementations, the user interface tool may be displayed within the user interface 122 such that the user interface tool is positioned directly beneath the explanation (e.g., question and answer) generated by the software application 102 to explain the particular result (e.g., tax credit) determined by the software application 102. In this manner, the user 140 may be prompted to interact with the user interface tool if, after reading the explanation, the user 140 determines the explanation is not helpful and therefore needs to be supplemented.

When the user 140 requests the explanation generated by the software application 102 to explain a particular result determined by the software application 102 be supplemented, the server 110 may be configured to provide the explanation generated by the software application 102 as an input to an artificial intelligence device 150. The server 110 may also be configured to provide one natural language prompt of a plurality of natural language prompts 160 as an input to the artificial intelligence device 150. In some embodiments, the computing environment 100 may include a database 170 configured to store the plurality of natural language prompts 160.

It should be appreciated that each of the plurality of natural language prompts is representative of a different modality (e.g., explain, question and answer, define, examples) for supplementing the explanation of the particular result determined by the software application 102. It should also be appreciated that the server 110 may select one of the plurality of natural language prompts based on input provided via the user 140 interacting with the user interface tool displayed via the user interface 122. More specifically, the user interface tool may include a plurality of user interface elements, and each of the user interface elements may be associated with a different modality for supplementing the explanation generated by the software application 102. In this manner, the user 140 may specify the modality for supplementing the explanation by selecting the corresponding user interface element.

The artificial intelligence device 150 may include a generative artificial intelligence model 152. The generative artificial intelligence model 152 may include a machine learning model. For instance, in some embodiments, the machine learning model may include a large language model (LLM). It should be understood, however, that the generative artificial intelligence model 152 may include any suitable type of machine learning model.

In some embodiments, the generative artificial intelligence model 152 can be a neural network. Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. In some cases, a neural network can include one or more aggregation layers, such as a softmax layer.

In some embodiments, training of the generative artificial intelligence model 152 involves a supervised learning process that involves providing training inputs (e.g., example natural language prompts, example explanations of particular results generated by the software application 102) to the machine learning model. The machine learning model can process the training inputs and determines outputs (e.g., supplemental content) based on the training inputs. The outputs are compared to known labels associated with the training inputs (e.g., labels manually applied to training data by experts or otherwise known to be associated with the training inputs, such as based on historical associations) to determine the accuracy of the model, and parameters of the model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the outputs produced by the model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for the model, such as based on validation data and test data, as is known in the art.

In some embodiments, the generative artificial intelligence model 152 has been pre-trained, such as based on a large set of training data. The generative artificial intelligence model 152 may also be re-trained on an ongoing basis, such as based on user feedback with respect to outputs produced by the model, thus providing a feedback loop by which generative artificial intelligence model 152 is iteratively improved.

The generative artificial intelligence model 152 can be configured to process the inputs (e.g., explanation and natural language prompt) and generate supplemental content further explaining the particular result determined by the software application 102. The supplemental content may vary depending on the different modality the user 140 selected (e.g., via the user interface tool in the user interface 122) for supplementing the explanation generated by the software application 102 to explain a particular result (e.g., tax credit) determined by the software application 102. For instance, in some embodiments, the supplemental content may include a more-detailed (e.g., more verbose) explanation of how the particular result was determined by the software application 102 based on data (e.g., from the forms uploaded by the user 140) that is specific to the user 140. Alternatively, or additionally, the supplemental content may include definitions for one or more key terms included in the explanation generated by the software application 102.

Although FIG. 1 depicts the artificial intelligence device 150 and database 170 as being separate from the server 110, it should be understood that the scope of the present disclosure is intended to cover embodiments in which functionality of at least one of the artificial intelligence device 150 or the database 170 is implemented by the server 110. For instance, in some embodiments, the plurality of natural language prompts 160 can be stored on the server 110. Alternatively, or additionally, the generative artificial intelligence model 152 can, in some embodiments, be implemented on the server 110.

Figure 2:
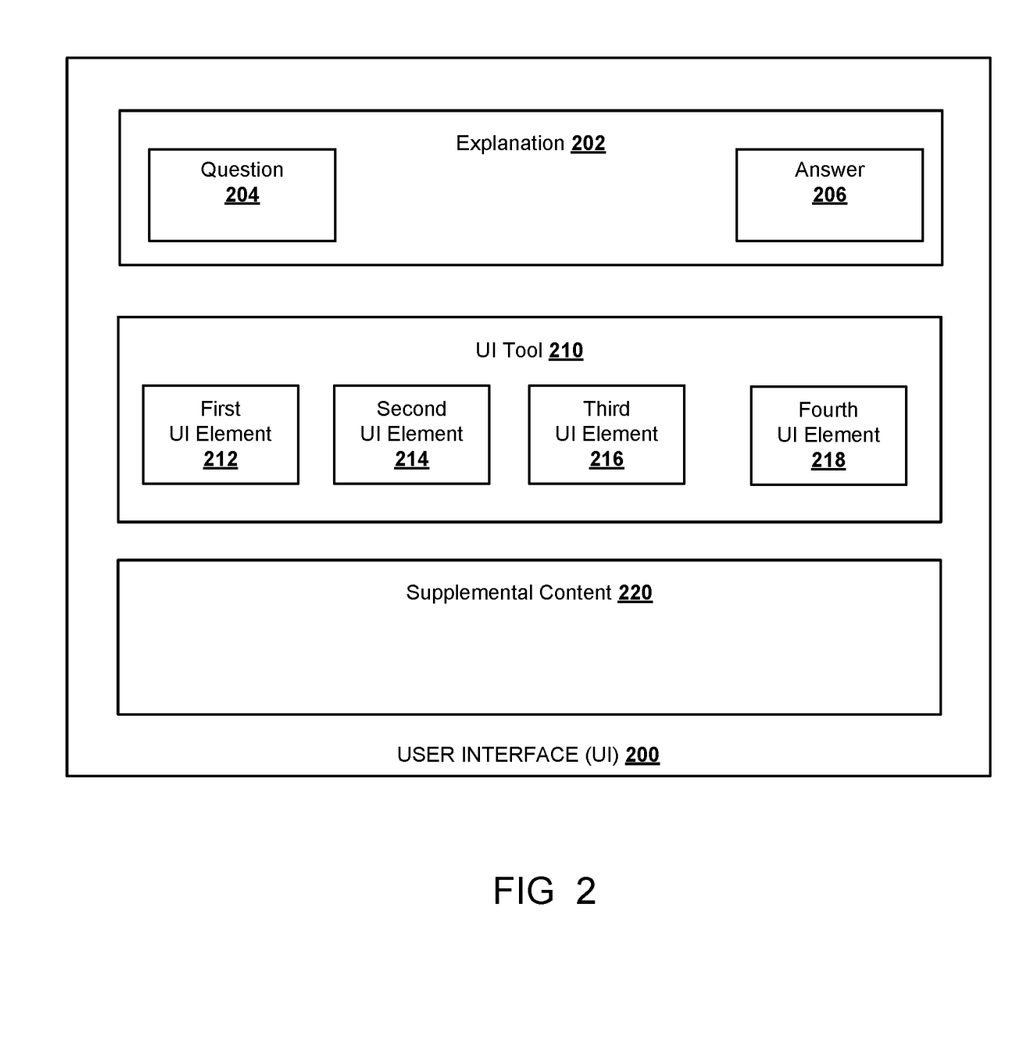
FIG. 2 depicts a layout of a user interface for displaying supplemental content for an explanation of a particular result determined by a software application according to some embodiments of the present disclosure.

User Interface for Generating Supplemental Content for an Explanation of a Particular Result Determined by a Software Application FIG. 2 depicts a user interface 200 for supplementing an explanation 202 generated by a software application (such as the software application 102 in FIG. 1) to explain a particular result (e.g., tax credit) determined by the software application according to some embodiments of the present disclosure. As shown, the explanation 202 may include a question 204 and answer 206 to explain the particular result (e.g., tax credit) determined by the software application. In alternative embodiments, the explanation may not include the question 204 and the answer 206. For instance, in some embodiments, the explanation 202 may simply include one or more declarative sentences explaining the particular result in some level of detail.

The user interface 200 may include a user interface tool 210. As shown, the user interface tool 210 may be positioned directly beneath the explanation 202. In this manner, a user (such as the user 140 in FIG. 1) that, after reading the explanation 202 of the particular result, finds the explanation 202 unhelpful may be prompted to interact with the user interface tool 210 to generate supplemental content 220 for the explanation 202 in one or more ways. It should be appreciated that the supplemental content 220 generated in response to user-interaction with the user interface tool 210 may aid the user in understanding how the particular result was determined by the software application and therefore eliminate the need for the user to request live support (e.g., in the form of an expert) to explain the particular result to the user. Details of the user interface tool 210 will now be discussed.

As shown, the user interface tool 210 may include a plurality of different user interface elements. For instance, in some embodiments, the user interface tool 210 may include a first user interface element, 212, a second user interface element 214, a third user interface element 216, and a fourth user interface element 218. In alternative embodiments, the user interface tool 210 may include more or fewer user interface elements. Each of the different user interface elements may be associated with a different modality for supplementing the explanation 202. As such, the supplemental content 220 that is generated based on user-selection of one of the plurality of user interface elements (e.g., first user interface element 212, second user interface element 214, third user interface element 216, and fourth user interface element 218) may vary depending on the selected modality.

In some embodiments, the first user interface element 212 may be associated with a first modality in which the supplemental content 220 includes a more detailed explanation of the particular result determined by the software application 102. It should be appreciated that the supplemental content 220 generated in response to user selection of the first user interface element 212 corresponding to the first modality may include additional details to help better explain to the user how the particular result was determined by the software application. In this manner, the additional details included in the supplemental content 220 can help the user understand how the particular result (e.g., tax credit) was determined by the software application.

In some embodiments, the second user interface element 214 may be associated with a second modality in which the supplemental content 220 includes one or more follow-up questions and corresponding answers that a user (e.g., novice user) may have after reading the explanation 202 (e.g., question 204 and answer 206) generated by the software application to explain the particular result determined by the software application.

In some embodiments, the third user interface element 216 may be associated with a third modality in which the supplemental content 220 includes definitions for one or more key terms included in the explanation 202 generated by the software application. For instance, the key terms may be defined in a manner that is easier for a novice user to understand.

In some embodiments, the fourth user interface element 218 may be associated with a fourth modality in which the supplemental content 220 includes one or more example scenarios of when the particular result is applicable and/or one or more example scenarios of when the particular result is not applicable. In this manner, the example scenarios may aid the user (e.g., a novice user) in understanding why the software application determined the particular result (e.g., tax credit) was or was not applicable to the user's specific tax situation.

Figure 3A:
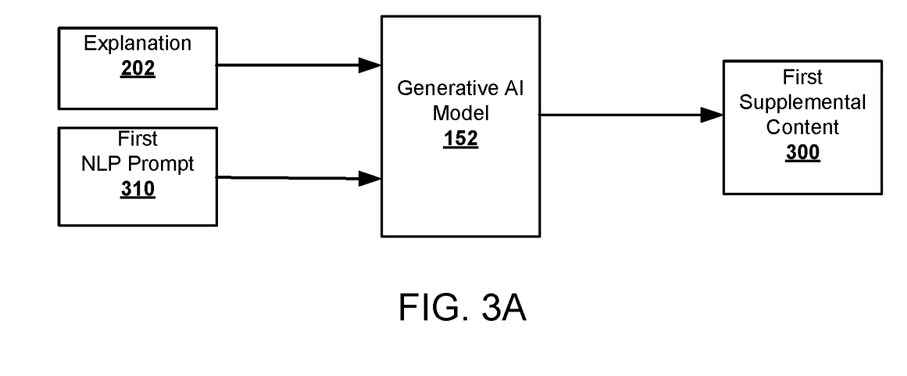
FIG. 3A depicts data flow for generating supplemental content for an explanation of a particular result determined by a software application according to a first modality of the present disclosure.
Figure 3B:
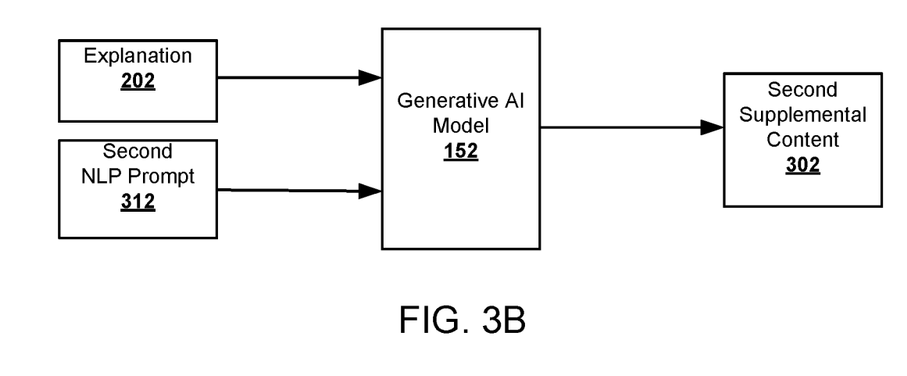
FIG. 3B depicts data flow for generating supplemental content for an explanation of a particular result determined by a software application according to a second modality of the present disclosure.
Figure 3C:
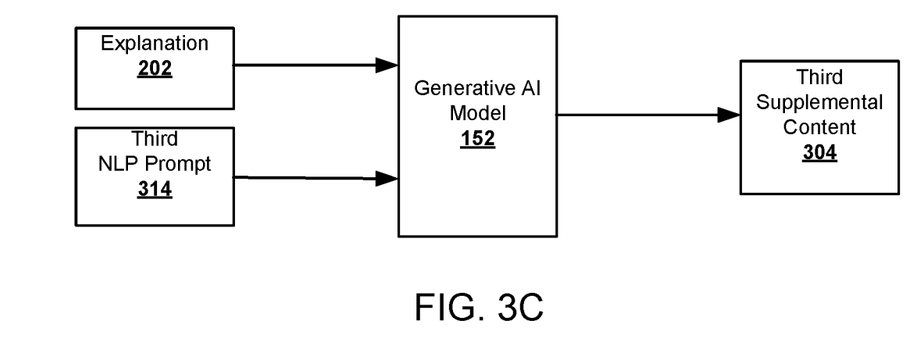
FIG. 3C depicts data flow for generating supplemental content for an explanation of a particular result determined by a software application according to a third modality of the present disclosure.
Figure 3D:
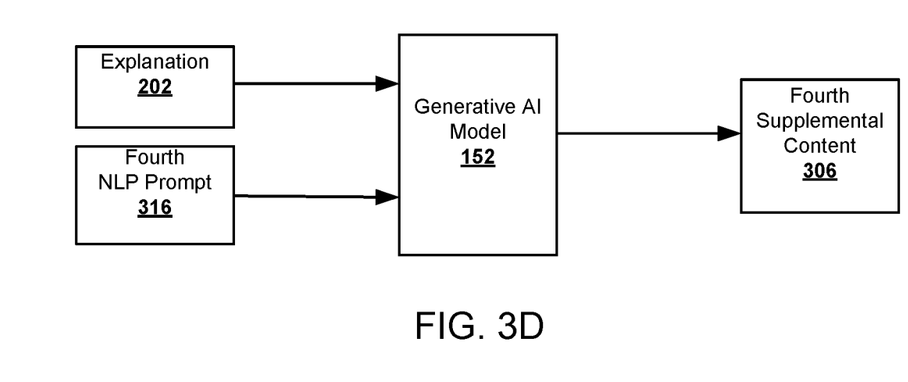
FIG. 3D depicts data flow for generating supplemental content for an explanation of a particular result determined by a software application according to a fourth modality of the present disclosure.

Data Flow for Generating Supplemental Content for an Explanation of a Particular Result Determined by a Software Application FIGS. 3A-3D illustrate data flow for generating different types of supplemental content for the explanation 202 generated by a software application (such as the software application 102 in FIG. 1) to explain a particular result (e.g., tax credit) determined by the software application in preparing a document for a user according to some embodiments of the present disclosure. More specifically, FIG. 3A illustrates data flow for generating first supplemental content 300 in response to the user (e.g., a novice user) requesting a first modality (such as via selection of the first user interface element 212 in FIG. 2) for supplementing the explanation 202. FIG. 3B illustrates data flow for generating second supplement content 302 in response to the user requesting a second modality (such as via selection of the second user interface element 214 in FIG. 2) for supplementing the explanation 202. FIG. 3C illustrates data flow for generating third supplement content 304 in response to the user requesting a third modality (such as via selection of the third user interface element 216 in FIG. 2) for supplementing the explanation 202. FIG. 3D illustrates data flow for generating fourth supplement content 306 in response to the user requesting a fourth modality (such as via selection of the fourth user interface element 218 in FIG. 2) for supplementing the explanation 202.

As shown in FIG. 3A, the explanation 202 and a first natural language prompt 310 of a plurality of natural language prompts (such as the plurality of natural language prompts 160 in FIG. 1) are provided as inputs to the generative artificial intelligence model 152. In some implementations, the explanation 202 and the first natural language prompt 310 may be provided to the generative artificial intelligence model 152 in response to user-selection of the first user interface element 212 (FIG. 2) of the user interface tool 210 (also FIG. 2). An example of the first natural language prompt 310 may be, "Based on the provided question and answer, please reformulate the answer in a way that is easy to understand for novice users. Provide more context and explain in depth." It should be appreciated that the generative artificial intelligence model 152 may output the first supplemental content 300 based, at least in part, on the respective inputs (that is, the explanation 202 and the first natural language prompt 310).

As shown in FIG. 3B, the explanation 202 and a second natural language prompt 312 of the plurality of natural language prompts are provided as inputs to the generative artificial intelligence model 152. In some implementations, the explanation 202 and the second natural language prompt 312 may be provided to the generative artificial intelligence model 152 in response to user-selection of the second user interface element 214 (FIG. 2) of the user interface tool 210 (also FIG. 2). An example of the second natural language prompt 312 may be, "Based on the provided question and answer, generate follow up questions a novice user may have along with answers for each of the follow-up questions. Make sure that the follow-ups and answers are closely related to the provided question and answer." It should be appreciated that the generative artificial intelligence model 152 may output the second supplemental content 302 based, at least in part, on the respective inputs (that is, the explanation 202 and the second natural language prompt 312).

As shown in FIG. 3C, the explanation 202 and a third natural language prompt 314 of the plurality of natural language prompts are provided as inputs to the generative artificial intelligence model 152. In some implementations, the explanation 202 and the third natural language prompt 314 may be provided to the generative artificial intelligence model 152 in response to user-selection of the third user interface element 216 (FIG. 2) of the user interface tool 210 (also FIG. 2). An example of the third natural language prompt 314 may be, "Based on the provided question and answer, define terms that may be unfamiliar to novice users. Provide more context and explain in depth." It should be appreciated that the generative artificial intelligence model 152 may output the third supplemental content 304 based, at least in part, on the respective inputs (that is, the explanation 202 and the third natural language prompt 314).

As shown in FIG. 3D, the explanation 202 and a fourth natural language prompt 316 of the plurality of natural language prompts are provided as inputs to the generative artificial intelligence model 152. In some implementations, the explanation 202 and the fourth natural language prompt 316 may be provided to the generative artificial intelligence model 152 in response to user-selection of the fourth user interface element 218 (FIG. 2) of the user interface tool 210 (also FIG. 2). An example of the fourth natural language prompt 314 may be, "Based on the provided question and answer, provide example scenarios when this would and would not apply." It should be appreciated that the generative artificial intelligence model 152 may output the forth supplemental content 306 based, at least in part, on the respective inputs (that is, the explanation 202 and the fourth natural language prompt 316).

It should be appreciated that the scope of the present disclosure is not intended to be limited to embodiments in which only the explanation 202 and a respective natural language prompt (e.g., first natural language prompt 310, second natural language prompt 312, third natural language prompt 314, fourth natural language prompt 316) corresponding to the selected modality of the supplemental content are provides as inputs to the generative artificial intelligence model 152. For instance, in some embodiments, additional inputs may be provided to the generative artificial intelligence model 152 regardless of the selected modality. More specifically, the additional inputs may include data that is specific to the user requesting the supplemental content to better understand the explanation 202 of the particular result determined by the software application. For instance, in some embodiments, the data may include, without limitation, the age of the user, educational background (e.g., high school graduate, college graduate, etc.), and/or an industry in which the user is occupied.

It should also be appreciated that, in some embodiments, the supplemental content (e.g., first supplemental content 300, second supplemental content 302, third supplemental content 304, fourth supplemental content 306) output by the generative artificial intelligence model 152 may be parsed prior to be displayed (e.g., via the user interface 122 in FIG. 2) for viewing by the user.

Figure 4:
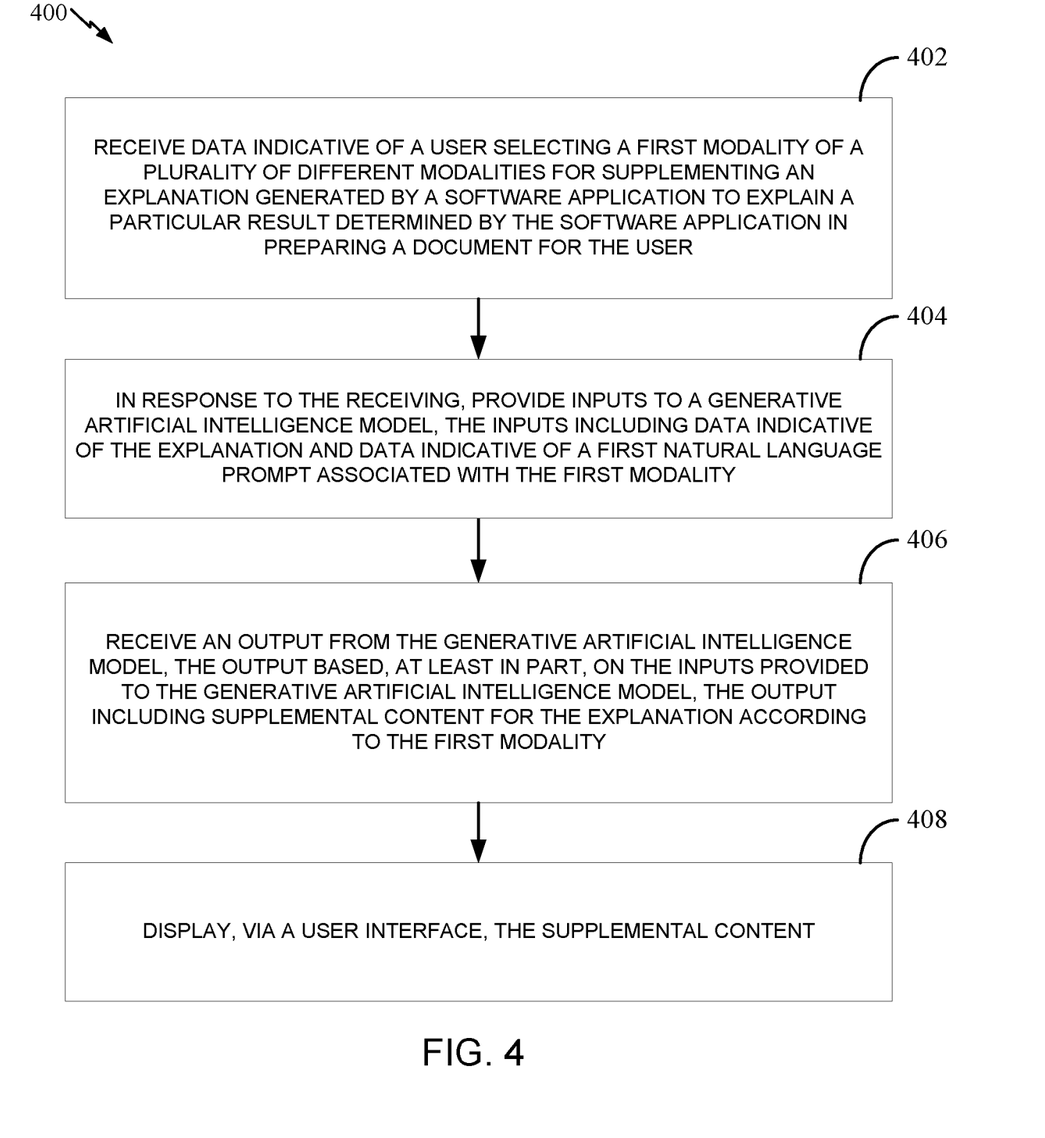
FIG. 4 depicts a flow diagram of a method for generating supplemental content for an explanation of a particular result determined by a software application according to some embodiments of the present disclosure.

Flow Diagram for Method of Generating Supplemental Content for an Explanation of a Particular Result Determined by a Software Application FIG. 4 is a flow diagram of an example method 400 for generating supplemental content for an explanation of a particular result determined by a software application according to some embodiments of the present disclosure. The method 400 may be performed by instructions executing on a processor of a server (such as the server 110 of FIG. 1).

Operation 402 may include receiving data indicative of a user selecting a first modality of a plurality of different modalities for supplementing an explanation generated by a software application (such as the software application 102 in FIG. 1) to explain a particular result determined by the software application in preparing a document for the user. In some embodiments, the data may be indicative of the user selecting a first user interface element of a plurality of user interface elements included in a user interface tool displayed via the user interface. Furthermore, the first user interface element may be associated with the first modality and every other user interface element included in the plurality of user interface elements may be associated with a respective modality of the plurality of different modalities.

Operation 404 may include providing inputs to a generative artificial intelligence model (such as the generative artificial intelligence model 152 in FIG. 1) in response to receiving the data at Operation 402. For instance, in some embodiments, the inputs may include data indicative of the explanation (e.g., question and answer) generated by the software application for the particular result. The inputs may further include a first natural language prompt associated with the first modality.

Operation 406 may include receiving an output from the generative artificial intelligence model. The output may be based on the inputs provided to the generative artificial intelligence model. Furthermore, the output may include supplemental content for the explanation according to the first modality.

Operation 408 may include displaying the supplemental content via a user interface. For instance, in some embodiments, displaying may include parsing the supplemental content and displaying the parsed content via the user interface.

In certain embodiments, the method 400 may include displaying the explanation of the particular result and a user interface tool (such as the user interface tool 210 in FIG. 2) including a plurality of different user interface elements which, in some embodiments, may be used to initiate generation of the supplemental content by the generative artificial intelligence model in a user interface (such as user interface 200 in FIG. 2) such that the user interface tool is positioned directly beneath the explanation. In addition, Operation 408 may include displaying the supplemental content within the user interface such that the supplemental content is positioned beneath the user interface tool.

Example Computing Systems

Figure 5A:
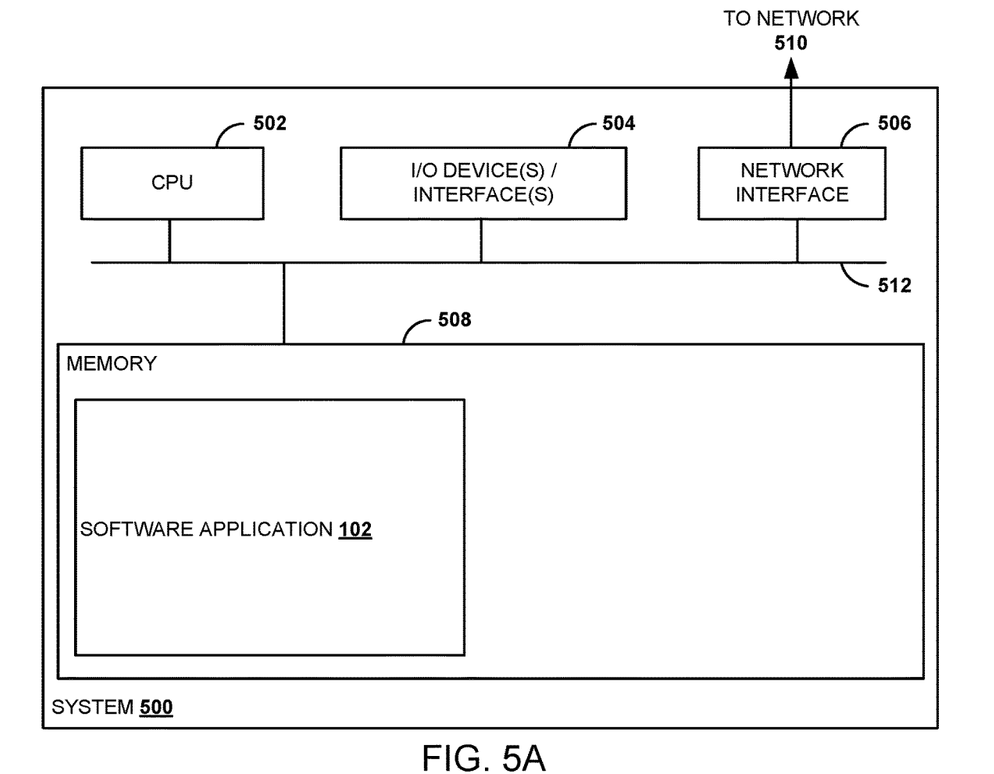
FIGS. 5A and 5B depict example computing systems according to some embodiments of the present disclosure.

FIG. 5A illustrates an example computing system 500 with which embodiments of the computing environment 100 of FIG. 1 may be implemented. For example, the computing system 500 may be representative of the server 110 of FIG. 1.

The computing system 500 includes a central processing unit (CPU) 502, one or more I/O device interfaces 504 that may allow for the connection of various I/O devices 504 (e.g., keyboards, displays, mouse devices, pen input, etc.) to the computing system 500, a network interface 506, a memory 508, and an interconnect 512. It is contemplated that one or more components of the computing system 500 may be located remotely and accessed via a network 510 (e.g., which may be the network(s) 130 of FIG. 1). It is further contemplated that one or more components of the computing system 500 may include physical components or virtualized components.

The CPU 502 may retrieve and execute programming instructions stored in the memory 508. Similarly, the CPU 502 may retrieve and store application data residing in the memory 508. The interconnect 512 transmits programming instructions and application data, among the CPU 502, the I/O device interface 504, the network interface 506, the memory 508. The CPU 502 is included to be representative of a single CPU, multiple CPUs, a single CPU having multiple processing cores, and other arrangements.

Additionally, the memory 508 is included to be representative of a random access memory or the like. In some embodiments, the memory 508 may include a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, the memory 508 may, in some embodiments, include the software application 102 discussed above with reference to FIG. 1.

Figure 5B:
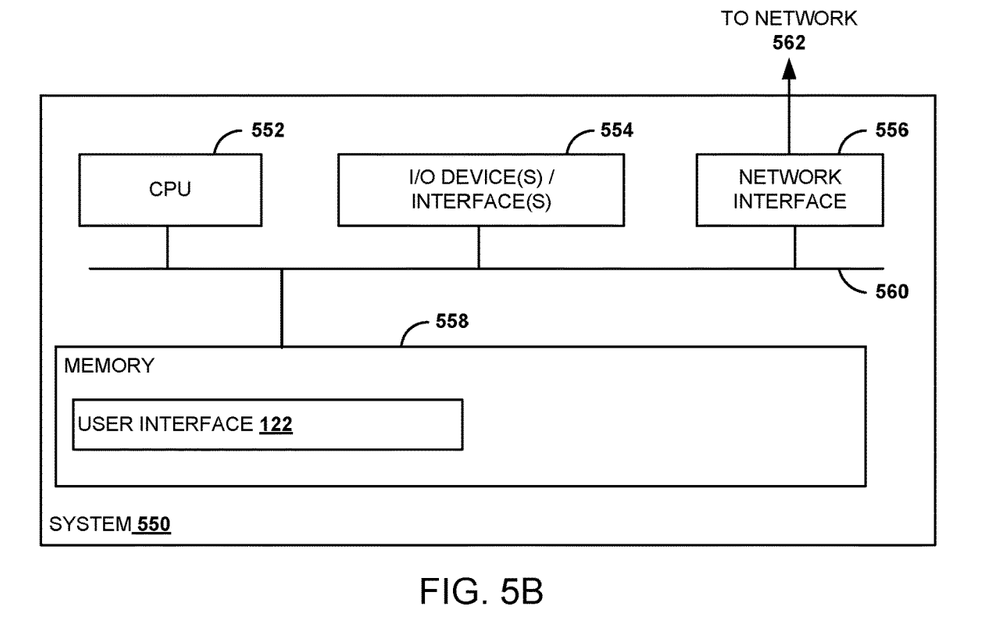

FIG. 5B illustrates an example computing system 550 with which embodiments of the computing environment 100 may be implemented. For example, the computing system 550 may be representative of the client device 120 of FIG. 1.

The computing system 550 includes a central processing unit (CPU) 552, one or more I/O device interfaces 554 that may allow for the connection of various I/O devices (e.g., keyboards, displays, mouse devices, pen input, etc.) to the computing system 550, a network interface 556, a memory 558, and an interconnect 560. It is contemplated that one or more components of the computing system 550 may be located remotely and accessed via a network 562 (e.g., which may be the network(s) 130 of FIG. 1). It is further contemplated that one or more components of the computing system 550 may include physical components or virtualized components.

The CPU 552 may retrieve and execute programming instructions stored in the memory 558. Similarly, the CPU 552 may retrieve and store application data residing in the memory 658. The interconnect 560 transmits programming instructions and application data, among the CPU 552, the I/O device interface 554, the network interface 556, the memory 558. The CPU 552 is included to be representative of a single CPU, multiple CPUs, a single CPU having multiple processing cores, and other arrangements.

Additionally, the memory 558 is included to be representative of a random access memory or the like. In some embodiments, the memory 558 may include a disk drive, solid state drive, or a collection of storage devices distributed across multiple storage systems. Although shown as a single unit, the memory 558 may be a combination of fixed and/or removable storage devices, such as fixed disc drives, removable memory cards or optical storage, network attached storage (NAS), or a storage area-network (SAN).

As shown, the memory 558 may, in some embodiments, include the user interface 122 discussed above with reference to FIG. 1.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general purpose and/or special-purpose processors. Examples include microprocessors, microcontrollers, DSP processors, and other circuitry that may execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor may read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed:

1. A method comprising:
   receiving, via one or more processors, data indicating user selection of a first user interface element of a plurality of user interface elements included in a user interface tool displayed on a screen of a user interface for a software application, wherein the first user interface element of the user interface tool is associated with a first modality of a plurality of different modalities for supplementing an explanation displayed on the screen of the user interface and generated by the software application to explain a particular result determined by the software application in preparing a document, and wherein every other user interface element included in the plurality of user interface elements is associated with a respective modality of the plurality of different modalities;
   providing, via the one or more processors and based on the receiving, inputs to a generative artificial intelligence model, the inputs comprising data indicative of the explanation and data indicative of a first natural language prompt associated with the first modality;
   receiving, via the one or more processors, an output from the generative artificial intelligence model, the output based, at least in part, on the inputs provided to the generative artificial intelligence model, the output including supplemental content for the explanation according to the first modality;
   displaying, via the one or more processors, the supplemental content within the screen of the user interface based on a position of the explanation within the screen of the user interface and a position of the user interface tool within the screen of the user interface;
   receiving, via the one or more processors, user feedback on the supplemental content; and
   training, via the one or more processors, the generative artificial intelligence model based on the user feedback.

2. The method of claim 1, wherein the displaying comprises displaying the supplemental content such that the user interface tool is positioned between the explanation and the supplemental content.

3. The method of claim 1, wherein the explanation comprises a question and an answer.

4. The method of claim 3, wherein the supplemental content comprises:
   a follow-up question to the explanation and an answer to the follow-up question;
   a definition for a term included in the explanation;
   an example scenario in which the particular result determined by the software application is applicable; or
   an example scenario in which the particular result determined by the software application is not applicable.

5. The method of claim 1, wherein the displaying comprises:
   parsing, by the one or more processors, the supplemental content to generate parsed content; and
   displaying, by the one or more processors and via the user interface, the parsed content within the user interface based, at least in part, on the position of the explanation and the position of the user interface tool.

6. The method of claim 1, wherein:
the document comprises a tax return; and
the particular result comprises a tax credit determined by the software application in preparing the tax return.

7. A system comprising:
one or more processors; and
one or more memory configured to store computer executable instructions that, when executed by the one or more processors, cause the one or more processors to:
receive data indicating user selection of a first user interface element of a plurality of user interface elements included in a user interface tool displayed on a screen of a user interface for a software application, wherein the first user interface element of the user interface tool is associated with a first modality of a plurality of different modalities for supplementing an explanation displayed on the screen of the user interface and generated by the software application to explain a particular result determined by the software application in preparing a document, and wherein every other user interface element included in the plurality of user interface elements is associated with a respective modality of the plurality of different modalities;
provide, based on the data indicating user selection of the first user interface element of the user interface tool, inputs to a generative artificial intelligence model, the inputs comprising data indicative of the explanation and data indicative of a first natural language prompt associated with the first modality;
receive an output from the generative artificial intelligence model, the output based, at least in part, on the inputs provided to the generative artificial intelligence model, the output including supplemental content for the explanation according to the first modality; and
display the supplemental content within the screen of the user interface based on a position of the explanation within the screen of the user interface and a position of the user interface tool within the screen of the user interface;
receive user feedback on the supplemental content; and
train the generative artificial intelligence model based on the user feedback.

8. The system of claim 7, wherein to display the supplemental content within the screen of the user interface, the one or more processors are further configured to display the supplemental content such that the user interface tool is positioned between the explanation and the supplemental content.

9. The system of claim 7, wherein the explanation comprises a question and an answer.

10. The system of claim 7, wherein the supplemental content comprises:
a follow-up question to the explanation and an answer to the follow-up question;
a definition for a term included in the explanation;
an example scenario in which the particular result determined by the software application is applicable; or
an example scenario in which the particular result determined by the software application is not applicable.

11. The system of claim 7, wherein to display the supplemental content within the screen of the user interface, the one or more processors are further configured to:
parse the supplemental content to generate parsed content; and
display the parsed content within the screen of the user interface based on the position of the explanation within the screen of the user interface and the position of the user interface tool within the screen of the user interface.

12. The system of claim 7, wherein the generative artificial intelligence model comprises a large language model.

13. A non-transitory computer readable medium comprising instructions to be executed in a computer system, wherein the instructions when executed in the computer system perform a method comprising:
receiving, via one or more processors, data indicating user selection of a first user interface element of a plurality of user interface elements included in a user interface tool displayed on a screen of a user interface for a software application, wherein the first user interface element of the user interface tool is associated with a first modality of a plurality of different modalities for supplementing an explanation displayed on the screen of the user interface and generated by the software application in preparing a document, and wherein every other user interface element included in the plurality of user interface elements is associated with a respective modality of the plurality of different modalities;
providing, via the one or more processors and based on the receiving, inputs to a generative artificial intelligence model, the inputs comprising data indicative of the explanation and data indicative of a first natural language prompt associated with the first modality;
receiving, via the one or more processors, an output from the generative artificial intelligence model, the output based, at least in part, on the inputs provided to the generative artificial intelligence model, the output including supplemental content for the explanation according to the first modality;
displaying, via the one or more processors, the supplemental content within the screen of the user interface based on a position of the explanation within the screen of the user interface and a position of the user interface tool within the screen of the user interface;
receiving, via the one or more processors, user feedback on the supplemental content; and
training, via the one or more processors, the generative artificial intelligence model based on the user feedback.

14. The non-transitory computer readable medium of claim 13, wherein the displaying comprises displaying the supplemental content such that the user interface tool is positioned between the explanation and the supplemental content.

* * * * *